(12) United States Patent
Zhang et al.

(10) Patent No.: US 11,074,429 B2
(45) Date of Patent: Jul. 27, 2021

(54) USER IDENTIFICATION METHOD, TERMINAL AND STORAGE MEDIUM

(71) Applicant: GUANGDONG OPPO MOBILE TELECOMMUNICATIONS CORP., LTD., Guangdong (CN)

(72) Inventors: Haiping Zhang, Dongguan (CN); Yibao Zhou, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/620,089

(22) PCT Filed: Jul. 25, 2018

(86) PCT No.: PCT/CN2018/097022
§ 371 (c)(1),
(2) Date: Dec. 6, 2019

(87) PCT Pub. No.: WO2019/024736
PCT Pub. Date: Feb. 7, 2019

(65) Prior Publication Data
US 2020/0202105 A1    Jun. 25, 2020

(30) Foreign Application Priority Data

Jul. 31, 2017    (CN) .......................... 201710644537.5

(51) Int. Cl.
*G06K 9/00* (2006.01)
*G06F 3/0488* (2013.01)
*G06F 21/32* (2013.01)

(52) U.S. Cl.
CPC ....... *G06K 9/00087* (2013.01); *G06F 3/0488* (2013.01); *G06F 21/32* (2013.01); *G06K 9/00013* (2013.01); *G06K 9/00067* (2013.01)

(58) Field of Classification Search
None
See application file for complete search history.

(56) References Cited

U.S. PATENT DOCUMENTS

2004/0252867 A1*  12/2004  Lan ..................... G06K 9/0004
                                                     382/124
2014/0286545 A1    9/2014  Yi et al.
(Continued)

FOREIGN PATENT DOCUMENTS

CN          1595422 A     3/2005
CN        101860622 A    10/2010
(Continued)

OTHER PUBLICATIONS

English machine translation of Chinese patent publication CN106096353. (Year: 2016).*

(Continued)

*Primary Examiner* — Nicholas J Lee (57) ABSTRACT

The application relates to the field of terminals and provides a user identification method, a terminal and a storage medium. The method includes that: responsive to detecting that a fingerprint of a user is in contact with a preset fingerprint identification region, a surface humidity of the preset fingerprint identification region is determined; when the surface humidity is greater than a preset humidity, the fingerprint of the user is acquired through the optical fingerprint sensor; the fingerprint acquired through the optical fingerprint sensor is matched with pre-stored fingerprint information; and screen unlocking is performed in case of successful matching. Through the technical solutions, the sensor for fingerprint unlocking may be determined according to a humidity of a screen, thereby ensuring stability of fingerprint unlocking and further improving a user experience.

18 Claims, 7 Drawing Sheets

(56) References Cited

U.S. PATENT DOCUMENTS

2017/0169271 A1    6/2017  Setterberg et al.
2017/0193210 A1    7/2017  Liu et al.

FOREIGN PATENT DOCUMENTS

| CN | 201638241 U | 11/2010 |
| CN | 105335707 A | 2/2016 |
| CN | 105404875 A | 3/2016 |
| CN | 106096353 A | 11/2016 |
| CN | 106295595 A | 1/2017 |
| CN | 106407945 A | 2/2017 |
| CN | 107528970 A | 12/2017 |

OTHER PUBLICATIONS

Supplementary European Search Report in the European application No. 18641381.9, dated Apr. 20, 2020.
English translation of the Written Opinion of the International Search Authority in the international application No. PCT/CN2018/097022, dated Oct. 23, 2018.
International Search Report in the international application No. PCT/CN2018/097022, dated Oct. 23, 2018.
Written Opinion of the International Search Authority in the international application No. PCT/CN2018/097022, dated Oct. 23, 2018.
First Office Action of Chinese application No. 201710644537.5, dated Apr. 23, 2019.
Office Action of the Indian application No. 201917052517, dated Feb. 22, 2021.

* cited by examiner

FIG. 9

USER IDENTIFICATION METHOD, TERMINAL AND STORAGE MEDIUM

TECHNICAL FIELD

The disclosure relates to the field of terminals, and more particularly, to a user identification method, a terminal and a storage medium.

BACKGROUND

Along with development of sciences and technologies and improvement of life, mobile terminals have gotten widely used.

For ensuring security of data stored in a mobile terminal, a password is usually set for verification.

In a conventional art, a common used manner of unlocking verification includes digital unlocking, pattern unlocking and the like. Along with development of sciences and technologies, a more convenient and securer technology has emerged, i.e., fingerprint unlocking. However, a common used semiconductor fingerprint sensor in an existing fingerprint unlocking technology can be sensitive but is poor in stability. During fingerprint unlocking, a water drop on a fingerprint of a user may easily cause a failure in identification and thus a screen cannot be unlocked.

SUMMARY

A user identification method, a terminal and a storage medium are provided according to embodiments of the disclosure, which may determine a sensor for fingerprint unlocking according to a humidity of a screen, thereby ensuring stability of fingerprint unlocking and further improving a user experience.

A first aspect of the embodiments of the disclosure provides a method for user identification, which may include the following operations.

Responsive to detecting that a fingerprint of a user is in contact with a preset fingerprint identification region, a surface humidity of the preset fingerprint identification region is determined.

When the surface humidity is greater than a preset humidity, the fingerprint of the user is acquired through an optical fingerprint sensor.

The fingerprint acquired through the optical fingerprint sensor is taken to match with pre-stored fingerprint information.

A screen is unlocked in case of successful matching.

A second aspect of the disclosure provides a terminal, which may include a first determination unit, an acquisition unit, a matching unit and an unlocking unit.

The first determination unit may be configured to, responsive to detecting that a fingerprint of a user is in contact with a preset fingerprint identification region, determine a surface humidity of the preset fingerprint identification region.

The acquisition unit may be configured to, when the surface humidity is greater than a preset humidity, acquire the fingerprint of the user through an optical fingerprint sensor.

The matching unit may be configured to match the fingerprint acquired through the optical fingerprint sensor with pre-stored fingerprint information.

The unlocking unit may be configured to unlock a screen in case of successful matching.

A third aspect of the disclosure provides a terminal, which may include a memory and a processor.

The memory may have stored an executable program code.

The processor may be coupled to the memory.

The processor may call the executable program code stored in the memory to execute any method in the first aspect of the disclosure. In an execution process of the method, a display may receive a display instruction of the processor to execute a display operation.

A fourth aspect of the disclosure provides a computer-readable storage medium, which may have stored a computer program for electronic data exchange, the computer program enabling a terminal to execute any method in the first aspect of the disclosure.

A fifth aspect of the disclosure provides a terminal, which may include a memory, a processor, an optical sensor and a semiconductor fingerprint sensor. A program code may have been stored in the memory. When the program code is executed by the processor, the processor may execute the following operations.

Responsive to detecting that a fingerprint of a user is in contact with a preset fingerprint identification region, a surface humidity of the preset fingerprint identification region is determined; when the surface humidity is greater than a preset humidity, the fingerprint of the user is acquired through the optical fingerprint sensor; the fingerprint acquired through the optical fingerprint sensor is taken to match with pre-stored fingerprint information; and screen unlocking is performed in case of successful matching.

Compared with the conventional art, the embodiments of the disclosure have the following beneficial effects.

In the embodiments of the disclosure, responsive to detecting that a fingerprint of a user is in contact with a preset fingerprint identification region, a surface humidity of the preset fingerprint identification region is determined; when the surface humidity is greater than a preset humidity, the fingerprint of the user is acquired through an optical fingerprint sensor; the fingerprint acquired through the optical fingerprint sensor is taken to match with the pre-stored fingerprint information; and a screen is unlocked in case of successful matching. Through the technical solutions, a sensor for fingerprint unlocking may be determined according to a humidity of a screen, thereby ensuring stability of fingerprint unlocking and further improving: a user experience.

BRIEF DESCRIPTION OF DRAWINGS

In order to describe the technical solutions of the embodiments of the disclosure more clearly, the drawings in descriptions about implementations will be simply introduced below. It is apparent that the drawings described below are some implementations of the disclosure. Other drawings may also be obtained by those of ordinary skill in the art according to these drawings without creative work.

DETAILED DESCRIPTION

The technical solutions in the embodiments of the disclosure will be clearly and completely described below in combination with the drawings in the embodiments of the disclosure. It is apparent that the described embodiments are not all embodiments but only part of embodiments of the disclosure. All other embodiments obtained by those of ordinary skill in the art based on the embodiments in the disclosure without creative work shall fall within the scope of protection of the disclosure.

In the method provided in the first aspect, the method may further includes the following operations.

In case of failed matching, an icon of a semiconductor fingerprint sensor and an icon of the optical fingerprint sensor may be displayed on the screen, and the user is prompted whether to switch to the semiconductor fingerprint sensor for fingerprint identification or not.

Responsive to determining that the icon of the semiconductor fingerprint sensor is selected, the user may be prompted to input the fingerprint again.

The fingerprint input by the user may be acquired through the semiconductor fingerprint sensor.

The fingerprint acquired through the semiconductor fingerprint sensor may be taken to match with the pre-stored fingerprint information.

The screen may be unlocked in case of successful matching.

In the method provided in the first aspect, the method may further include the following operations.

When the surface humidity is less than or equal to the preset humidity, the fingerprint of the user may be acquired through the semiconductor fingerprint sensor. The fingerprint acquired through the semiconductor fingerprint sensor may be taken to match with the pre-stored fingerprint information.

The screen may be unlocked in case of successful matching.

In the method provided in the first aspect, the method may further include the following operations.

An air humidity in an ambient environment may be detected to determine the air humidity in the environment.

When the air humidity is greater than an air humidity threshold, the optical fingerprint sensor may be determined as a default fingerprint identification sensor.

In the method provided in the first aspect, the method may further include the following operation.

Responsive to detecting that the air humidity is less than or equal to the air humidity threshold, the semiconductor fingerprint sensor may be determined as the default fingerprint identification sensor.

In the terminal provided in the second aspect, the terminal may further include a displaying unit and a prompting unit.

The displaying unit may be configured to, in case of failed matching, display an icon of a semiconductor fingerprint sensor and an icon of the optical fingerprint sensor.

The prompting unit may be configured to prompt the user whether to switch to the semiconductor fingerprint sensor for fingerprint identification or not.

The prompting unit may be further configured to, responsive to determining that the icon of the semiconductor fingerprint sensor is selected, prompt the user to input the fingerprint again.

The acquisition unit may be configured to acquire the fingerprint input by the user through the semiconductor fingerprint sensor.

The matching unit may be configured to match the fingerprint acquired through the semiconductor fingerprint sensor with the pre-stored fingerprint information.

The unlocking unit may be configured to unlock the screen in case of successful matching.

In the terminal provided in the second aspect, the acquisition unit may be configured to, when the surface humidity is less than or equal to the preset humidity, acquire the fingerprint of the user through the semiconductor fingerprint sensor.

The matching unit may be configured to match the fingerprint acquired through the semiconductor fingerprint sensor with the pre-stored fingerprint information.

The unlocking unit may be configured to unlock the screen in case of successful matching.

In the terminal provided in the second aspect, the terminal may further include a detection unit and a second determination unit.

The detection unit may be configured to detect an air humidity in an ambient environment to determine the air humidity in the environment.

The second determination unit may be configured to, when the air humidity is greater than an air humidity threshold, determine the optical fingerprint sensor as a default fingerprint identification sensor.

In the terminal provided in the second aspect, the second determination unit may be configured to, when the air humidity is less than or equal to the air humidity threshold, determine the semiconductor fingerprint sensor as the default fingerprint identification sensor.

In the terminal provided in the fifth aspect, the terminal may include the memory and the processor.

The memory may have stored the pre-stored fingerprint information.

The processor may be configured to, when the surface humidity is greater than the preset humidity, send a fingerprint acquisition instruction to the optical fingerprint sensor.

The optical fingerprint sensor may be configured to acquire the fingerprint of the user according to the fingerprint acquisition instruction sent by the processor.

The processor may be further configured to receive fingerprint information fed back by the optical fingerprint sensor, match the fingerprint acquired through the optical fingerprint sensor with the pre-stored fingerprint information in the memory and, in case of successful matching, perform screen unlocking.

In the terminal provided in the fifth aspect, the processor may be further configured to, in case of failed matching, send an instruction to the display screen.

The display screen may be configured to, when receiving the instruction sent by the processor, display an icon of the semiconductor fingerprint sensor and an icon of the optical fingerprint sensor and prompt the user whether to switch to the semiconductor fingerprint sensor for fingerprint identification or not.

The processor may be further configured to, responsive to determining that the icon of the semiconductor fingerprint sensor is selected, prompt the user to input the fingerprint again.

The semiconductor fingerprint sensor may be configured to acquire the fingerprint input by the user.

The processor may be further configured to match the fingerprint acquired through the semiconductor fingerprint sensor with the pre-stored fingerprint information and, in case of successful matching, unlock the display screen.

In the terminal provided in the fifth aspect, the processor may be further configured to, when the surface humidity is less than or equal to the preset humidity, send the fingerprint acquisition instruction to the semiconductor fingerprint sensor.

The semiconductor fingerprint sensor may be configured to acquire the fingerprint of the user according to the fingerprint acquisition instruction sent by the processor.

The processor may be further configured to receive the fingerprint information fed back by the semiconductor fingerprint sensor, match the fingerprint acquired through the semiconductor fingerprint sensor with the pre-stored fingerprint information and, in case of successful matching, perform screen unlocking.

In the terminal provided in the fifth aspect, the humidity sensor may be further configured to detect an air humidity in an ambient environment to determine the air humidity in the environment.

The processor may be further configured to, when the air humidity is greater than an air humidity threshold, determine the optical fingerprint sensor as a default fingerprint identification sensor and, responsive to detecting that the air humidity is less than or equal to the air humidity threshold, determine the semiconductor fingerprint sensor as the default fingerprint identification sensor.

In a method provided in a sixth aspect, a terminal may further include a processor and a memory. The memory may have pre-stored fingerprint information.

The processor may receive fingerprint information fed back by a semiconductor fingerprint sensor or an optical fingerprint sensor and match the fed back fingerprint information with the pre-stored fingerprint information in the memory.

In case of successful matching, the processor may instruct a display to perform screen unlocking.

In the method provided in the sixth aspect, the method may further include the following operations.

When an air humidity is greater than an air humidity threshold, the processor determines the optical fingerprint sensor as a default fingerprint identification sensor; and responsive to detecting that the air humidity is less than or equal to the air humidity threshold, the processor determines the semiconductor fingerprint sensor as the default fingerprint identification sensor.

The embodiments of the disclosure provide a user identification method, a terminal and a storage medium, which may determine a sensor for fingerprint unlocking according to a humidity of a screen, thereby ensuring stability of fingerprint unlocking and further improving a user experience.

Detailed descriptions will be made below respectively.

Figure 1A:
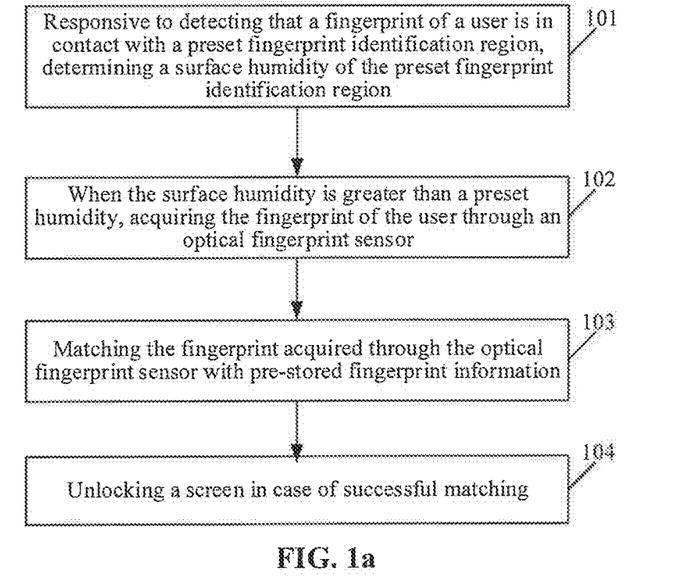
FIG. 1a is a flowchart of a user identification method according to an embodiment of the disclosure.

Referring to FIG. 1a, FIG. 1a is a flowchart of a user identification method according to an embodiment of the disclosure. An interface pushing method may include the following operations.

In S101, responsive to detecting that a fingerprint of a user is in contact with a preset fingerprint identification region, a surface humidity of the preset fingerprint identification region is determined, it is to be pointed out that an execution body of the embodiment may be a terminal.

It may be understood that, when a user clicks a screen and the screen is in a locked state, it is needed to prompt the user for unlocking the screen and, if an unlocking manner is fingerprint unlocking, the user is required to input a fingerprint at a specified position.

It is to be pointed out that the fingerprint may be uneven skin texture on a surface of a finger. The fingerprint has such characteristics as uniqueness and stability, and thus may contribute to identity identification.

In the embodiment of the disclosure, the terminal may have various types, such as a mobile phone, a pad, a Personal Digital Assistant (PDA) and a Mobile Internet Device (MID), There are no limits made in the embodiments of the disclosure.

In S102, when the surface humidity is greater than a preset humidity, the fingerprint of the user is acquired through an optical fingerprint sensor.

Optionally, the method further may include that: when the surface humidity is less than or equal to the preset humidity, the fingerprint of the user is acquired through a semiconductor fingerprint sensor; the fingerprint acquired through the semiconductor fingerprint sensor is taken to match with the pre-stored fingerprint information; and a screen is unlocked in case of successful matching.

Figure 1B:
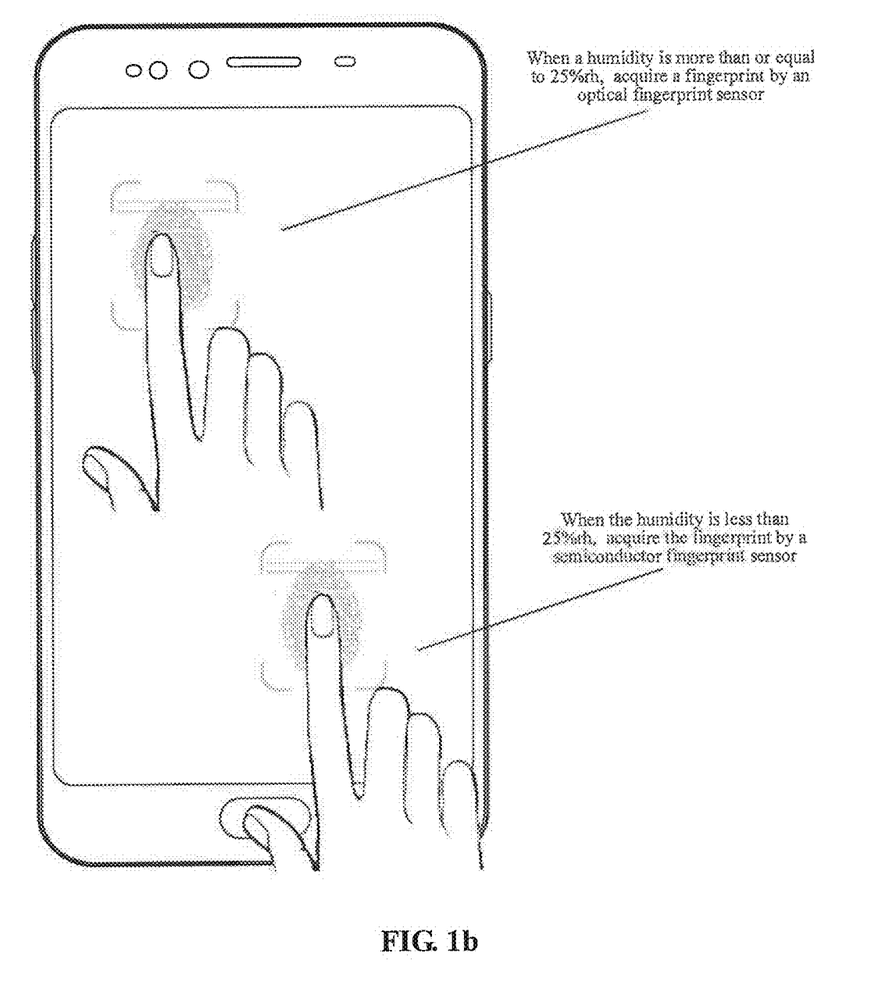
FIG. 1b is a schematic diagram of a fingerprint acquisition interface according to an embodiment of the disclosure.

For example, as shown in FIG. 1b, the preset humidity is 25% rh; the fingerprint may be acquired through the optical fingerprint sensor responsive to detecting that a relative humidity of the user fingerprint identification region is more than or equal to 25% rh, and the fingerprint may be acquired through the semiconductor fingerprint sensor responsive to detecting that the relative humidity of the user fingerprint identification region is less than 25% rh.

It is to be pointed out that fingerprint sensors may be divided into optical fingerprint sensors and semiconductor fingerprint sensors. The semiconductor fingerprint sensors may be further divided into temperature-sensing fingerprint sensors and capacitive-sensing fingerprint sensors.

In addition, it is to be pointed out that the optical fingerprint sensor may make a measurement according to an optical principle and may have many advantages such as non-contact and non-destruction, almost no interference and high-speed transmission. The principle is that a finger may press one side of a flat of glass, a Light-Emitting Diode (LED) light source and a Charge Coupled Device (CCD) camera may be mounted on the other side of the glass, a beam emitted by an LED may irradiate the glass at a certain angle and the camera is configured to receive light reflected from a surface of the glass. Ridges of the fingerprint are in contact with the surface of the glass while valleys are not in contact with the surface of the glass, so that the light irradiating the surface of the glass which is in contact with the ridges of the fingerprint may be diffusely reflected, and the light irradiating the surface of the glass corresponding to the valleys of the fingerprint may be totally reflected. Therefore, in an image captured by the COD camera, the part corresponding to the ridges of the fingerprint may be in a relatively dark color and the part corresponding to the valleys of the fingerprint may be in a relatively light color.

Similar principles are for capacitive or inductive semiconductor fingerprint sensors. For example, a finger is put on a flat panel integrated with thousands of semiconductor components, the contacting region being on a side opposite to a capacitor. Since the surface of the finger is uneven, the distance between the ridges of the finger and the plane is different from the distance between the valleys of the finger and the plane, and thus generated capacitance/inductance values are different. According to this principle, fingerprint acquisition may be implemented based on the acquired different values.

In addition, it is to be pointed out that the capacitive sensor may be a mainstream semiconductor fingerprint sensor on the market at present, and the sensor is high in acquisition resolution but modest in adaptability to dry and wet fingers and particularly relatively poor in adaptability to wet fingers.

In S103, the fingerprint acquired through the optical fingerprint sensor is taken to match with pre-stored fingerprint information.

It may be understood that the pre-stored fingerprint information refers to a fingerprint input and stored in advance by the user and is usually a fingerprint of the user himself or herself.

In S104, a screen is unlocked in case of successful matching.

It may be understood that successful matching refers to that a degree of matching between the fingerprint acquired through the optical fingerprint sensor and the pre-stored fingerprint information is greater than a preset matching degree. For example, the preset matching degree is 95% or 98%. There are no limits made herein.

It may be understood that, when the fingerprint acquired through the optical fingerprint sensor does not match with the pre-stored fingerprint information, another fingerprint sensor may be selected for identification. For example, all fingerprint identification sensors may be presented on a display screen and their application scenarios may be introduced respectively, and then a user may make a choice.

Optionally, the method may further include that; in case of failed matching, an icon of a semiconductor fingerprint sensor and an icon of the optical fingerprint sensor are displayed on the screen, and the user is prompted whether to switch to the semiconductor fingerprint sensor for fingerprint identification or not; responsive to determining that the icon of the semiconductor fingerprint sensor is selected, the user is prompted to input the fingerprint again; the fingerprint input by the user is acquired through the semiconductor fingerprint sensor; the fingerprint acquired through the semiconductor fingerprint sensor is taken to match with the pre-stored fingerprint information; and the screen is unlocked in case of successful matching.

In addition, the terminal may detect a humidity in an ambient environment through a humidity sensor to pre-evaluate the ambient environment. For example, when the humidity is greater than a preset humidity, it may be determined that the present environment may be a bathroom and the finger of the user may be wet, and in such case, it is needed to set the sensor to be the optical fingerprint sensor to ensure stability of fingerprint identification of the terminal in such environment.

Optionally, the method may further include that; an air in an ambient environment is detected to determine the air humidity in the environment; and when the air humidity is greater than an air humidity threshold, the optical fingerprint sensor is determined as a delimit fingerprint identification sensor. Responsive to detecting that the air humidity is less than or equal to the air humidity threshold, the semiconductor fingerprint sensor is determined as the default fingerprint identification sensor.

In addition, optionally, when the terminal completes prompting the user to unlock the screen, optional sensors may be directly presented to the user for selection.

In addition, optionally, the terminal may detect the ambient environment in each preset period to select a fingerprint sensor corresponding to the humidity of the ambient environment. Moreover, the preset period may be strongly related to the state of charge (SOC) of a battery. For example, when the SOC is greater than a first preset threshold, detection may be performed at a first frequency; and when the SOC is less than the first preset threshold, detection may be performed at a second frequency. The first frequency may be higher than the second frequency. The first preset threshold may be 50%, 60% and the like. There are no limits made herein.

From the above, it may be seen that, through the technical solution provided in the embodiment of the disclosure, responsive to detecting that a fingerprint of a user is in contact with a preset fingerprint identification region, a surface humidity of the preset fingerprint identification region may be determined; when the surface humidity is greater than the preset humidity, the fingerprint of the user may be acquired through an optical fingerprint sensor; the fingerprint acquired through the optical fingerprint sensor may be taken to match with the pre-stored fingerprint information; and screen unlocking may be implemented in case of successful matching. Through the technical solution, a sensor for fingerprint unlocking may be determined according to a humidity of a screen, thereby ensuring stability of fingerprint unlocking and further improving a user experience.

Figure 2:
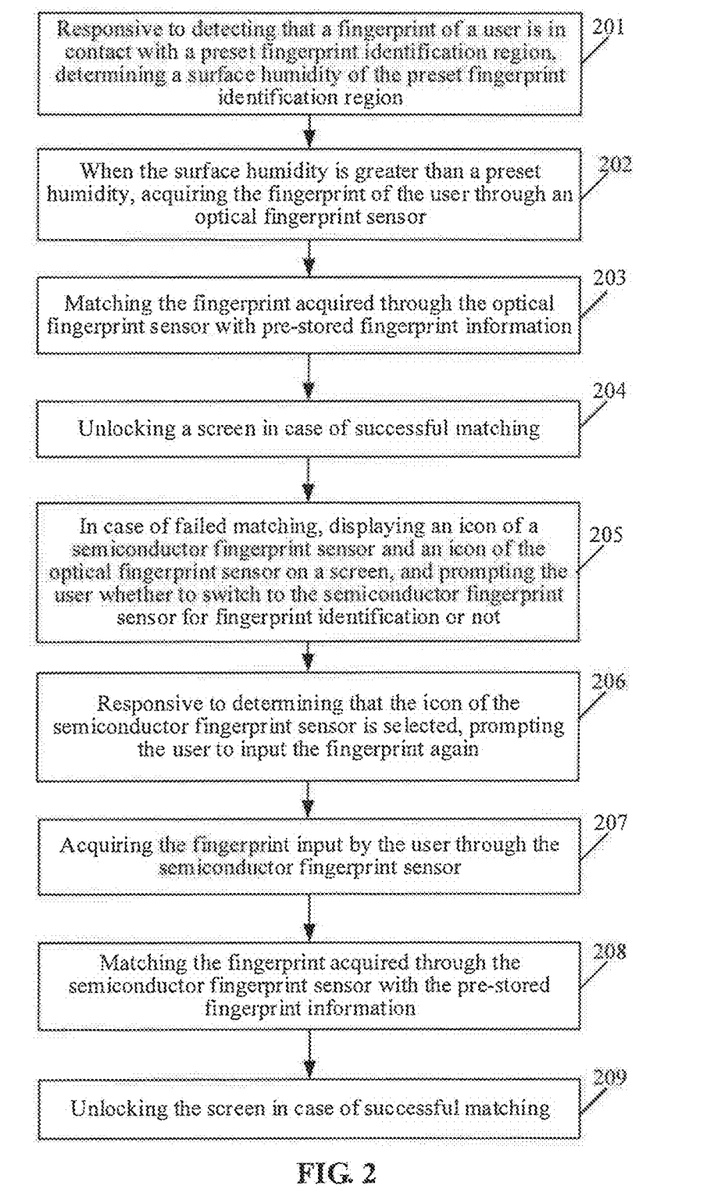
FIG. 2 is a flowchart of another user identification method according to an embodiment of the disclosure.

Referring to FIG. 2, FIG. 2 is a flowchart of a user identification method according to an embodiment of the disclosure. As shown in FIG. 2, the user identification method may include the following operations.

In S201, responsive to detecting that a fingerprint of a user is in contact with a preset fingerprint identification region, a surface humidity of the preset fingerprint identification region is determined.

In the embodiment of the disclosure, an execution body may be a terminal. The terminal may have various types, such as a mobile phone, a pad, a PDA and an MID. There are no limits made in the embodiment of the disclosure.

In S202, when the surface humidity is greater than a preset humidity, the fingerprint of the user is acquired through an optical fingerprint sensor.

In S203, the fingerprint acquired through the optical fingerprint sensor is taken to match with pre-stored fingerprint information.

In S204, a screen is unlocked in case of successful matching.

In S205, in case of failed matching, an icon of a semiconductor fingerprint sensor and an icon of the optical fingerprint sensor are displayed on the screen, and the user is prompted whether to switch to the semiconductor fingerprint sensor for fingerprint identification or not.

In S206, responsive to determining that the icon of the semiconductor fingerprint sensor is selected, the user is prompted to input the fingerprint again.

In S207, the fingerprint input by the user is acquired through the semiconductor fingerprint sensor.

In S208, the fingerprint acquired through the semiconductor fingerprint sensor is taken to match with the pre-stored fingerprint information.

In S209, the screen is unlocked in case of successful matching.

In the method described in FIG. 2, when the fingerprint acquired through the optical fingerprint sensor does not match with the pre-stored fingerprint information, the user may be prompted to select the semiconductor fingerprint sensor to acquire the fingerprint again for authentication, thereby improving stability of fingerprint identification in a present environment.

Figure 3:
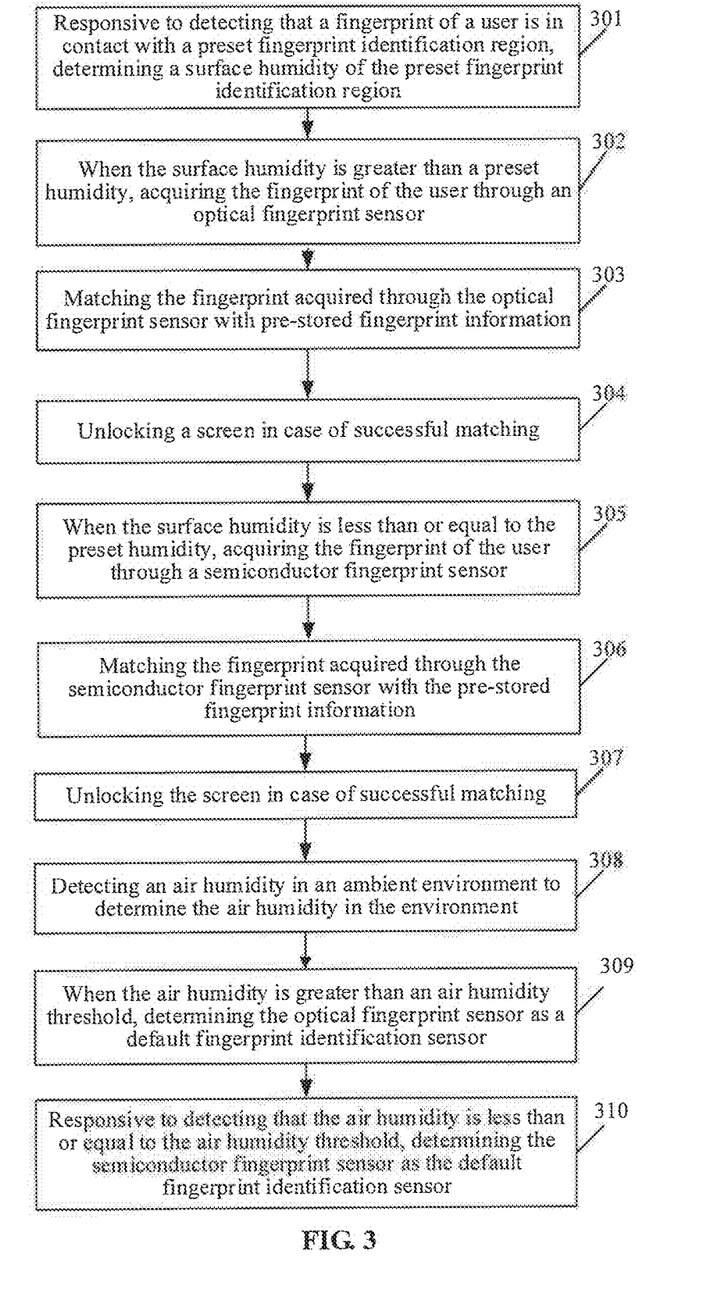
FIG. 3 is a flowchart of another user identification method according to an embodiment of the disclosure.

Referring to FIG. 3, FIG. 3 is a flowchart of a user identification method according to an embodiment of the disclosure. As shown in FIG. 3, the user identification method may include the following operations.

In S301, responsive to detecting that a fingerprint of a user is in contact with a preset fingerprint identification region, a surface humidity of the preset fingerprint identification region is determined.

In the embodiment of the disclosure, an execution body may be a terminal. The terminal may have various types, such as a mobile phone, a pad, a PDA and an MID, There are no limits made in the embodiment of the disclosure.

In S302, when the surface humidity is greater than a preset humidity, the fingerprint of the user is acquired through an optical fingerprint sensor.

In S303, the fingerprint acquired through the optical fingerprint sensor is taken to match with pre-stored fingerprint information.

In S304, a screen is unlocked in case of successful matching.

In S305, when the surface humidity is less than or equal to the preset humidity, the fingerprint of the user is acquired through a semiconductor fingerprint sensor.

In S306, the fingerprint acquired through the semiconductor fingerprint sensor is taken to match with the pre-stored fingerprint information.

In S307, the screen is unlocked in case of successful matching.

In S308, an air humidity in an ambient environment is detected to determine the air humidity in the environment.

In S309, when the air humidity is greater than an air humidity threshold, the optical fingerprint sensor is determined as a default fingerprint identification sensor.

In S310, responsive to detecting that the air humidity is less than or equal to the air humidity threshold, the semiconductor fingerprint sensor is determined as the default fingerprint identification sensor.

In the method described in FIG. 3, the present environment may be pre-evaluated according to the air humidity in the present environment, and a fingerprint identification sensor corresponding to the air humidity in the present environment may be selected as the default sensor, so that convenience is brought to a user and a user experience is improved.

Figure 4:
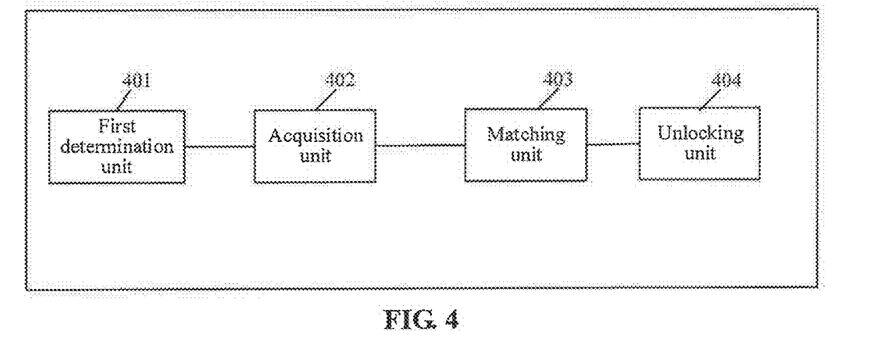
FIG. 4 is a structure diagram of a user terminal according to an embodiment of the disclosure.

Referring to FIG. 4, FIG. 4 is a structure diagram of a terminal according to an embodiment of the disclosure. The terminal described in FIG. 4 may include a first determination unit 401, an acquisition unit 402, a matching unit 403 and an unlocking unit 404.

The first determination unit 401 is configured to, responsive to detecting that a fingerprint of a user is in contact with a preset fingerprint identification region, determine a surface humidity of the preset fingerprint identification region.

The acquisition unit 402 is configured to, when the surface humidity is greater than a preset humidity, acquire the fingerprint of the user through an optical fingerprint sensor.

The matching unit 403 is configured to match the fingerprint acquired through the optical fingerprint sensor with pre-stored fingerprint information.

The unlocking unit 404 is configured to unlock a screen in case of successful matching.

It is to be pointed out that the structure shown in FIG. 4 may be configured to execute the method shown by S101 to S104.

Figure 5:
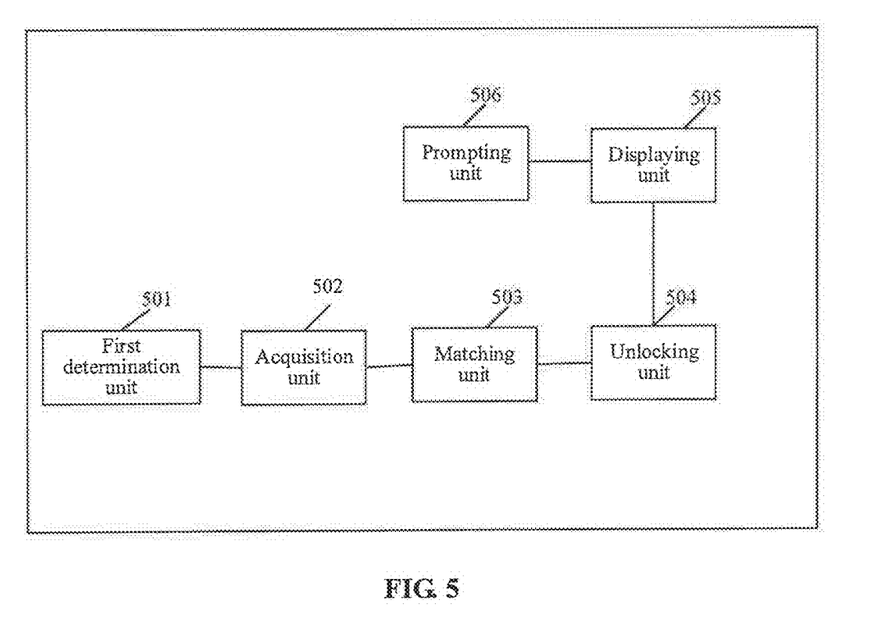
FIG. 5 is a structure diagram of another user terminal according to an embodiment of the disclosure.

Also referring to FIG. 5, FIG. 5 is a structure diagram of another terminal according to an embodiment of the disclosure. The terminal shown in FIG. 5 may further include a first determination unit 501, an acquisition unit 502, a matching unit 503, an unlocking unit 504, a displaying unit 505 and a prompting unit 506.

The first determination unit 501 is configured to, responsive to detecting that a fingerprint of a user is in contact with a preset fingerprint identification region, determine a surface humidity of the preset fingerprint identification region.

The acquisition unit 502 is configured to, when the surface humidity is greater than a preset humidity, acquire the fingerprint of the user through an optical fingerprint sensor.

The matching unit 503 is configured to match the fingerprint acquired through the optical fingerprint sensor with pre-stored fingerprint information.

The unlocking unit 504 is configured to unlock the screen in case of successful matching.

The displaying unit 505 is configured to, in case of failed matching, display an icon of a semiconductor fingerprint sensor and an icon of the optical fingerprint sensor.

The prompting unit 506 is configured to prompt the user whether to switch to the semiconductor fingerprint sensor for fingerprint identification or not.

The prompting unit 506 is further configured to, responsive to determining that the icon of the semiconductor fingerprint sensor is selected, prompt the user to input the fingerprint again.

The acquisition unit 502 is configured to acquire the fingerprint input by the user through the semiconductor fingerprint sensor.

The matching unit 503 is configured to match the fingerprint acquired through the semiconductor fingerprint sensor with the pre-stored fingerprint information.

The unlocking unit 504 is configured to unlock the screen in case of successful matching.

It may be understood that the terminal shown in FIG. 5 may be configured to execute the method shown by S201 to S209.

Figure 6:
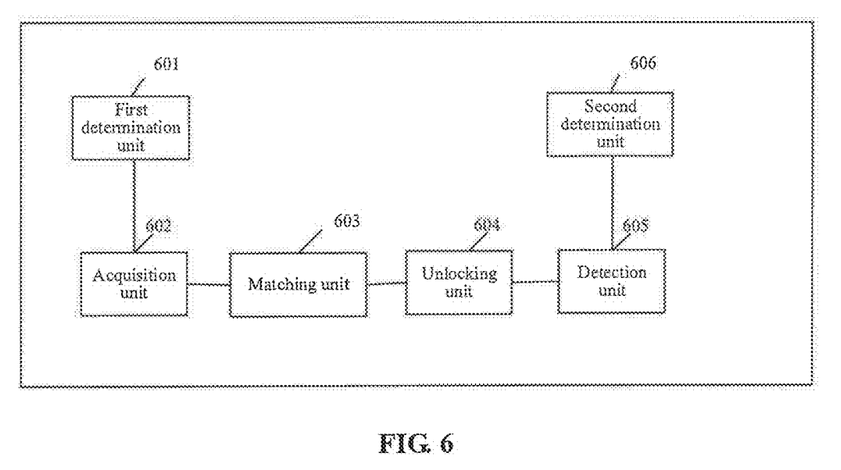
FIG. 6 is a structure diagram of another user terminal according to an embodiment of the disclosure.

Also referring to FIG. 6, FIG. 6 is a structure diagram of another user terminal according to an embodiment of the disclosure. The terminal shown in FIG. 6 includes a first determination unit 601, an acquisition unit 602, a matching unit 603, an unlocking unit 604, a detection unit 605 and a second determination unit 606.

The first determination unit 601 is configured to, responsive to detecting that a fingerprint of a user is in contact with a preset fingerprint identification region, determine a surface humidity of the preset fingerprint identification region.

The acquisition unit 602 is configured to, when the surface humidity is greater than a preset humidity, acquire the fingerprint of the user through an optical fingerprint sensor.

The matching unit 603 is configured to match the fingerprint acquired through the optical fingerprint sensor with pre-stored fingerprint information.

The unlocking unit 604 is configured to unlock a screen in case of successful matching.

The acquisition unit 602 is configured to, when the surface humidity is less than or equal to the preset humidity, acquire the fingerprint of the user through a semiconductor fingerprint sensor.

The matching unit 603 is configured to match the fingerprint acquired through the semiconductor fingerprint sensor with the pre-stored fingerprint information.

The unlocking unit 604 is configured to unlock the screen in case of successful matching.

The detection unit 605 is configured to detect an air humidity in an ambient environment to determine the air humidity in the environment.

The second determination unit 606 is configured to, when the air humidity is greater than an air humidity threshold, determine the optical fingerprint sensor as a default fingerprint identification sensor and, responsive to detecting that the air humidity is less than or equal to the air humidity threshold, determine the semiconductor fingerprint sensor as the default fingerprint identification sensor.

It may be understood that the terminal shown in FIG. 6 may be configured to execute the method shown by S301 to S310.

Figure 7:
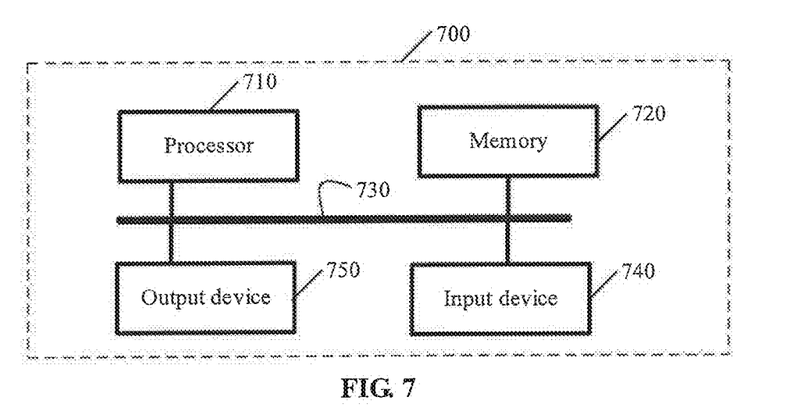
FIG. 7 is a physical structure diagram of a user terminal according to an embodiment of the disclosure.

Referring to FIG. 7, FIG. 7 is a structure diagram of another terminal according to an embodiment of the disclosure. As shown in FIG. 7, the terminal may include at least one processor 710, for example, a Central Processing Unit (CPU), a memory 720, at least one communication bus 730, an input device 740 and an output device 750. The communication bus 730 is configured to implement communication connection between these components. The memory 720 may be a high-speed Random Access Memory (RAM) or a non-volatile memory, for example, at least one disk memory. Optionally, the memory 720 may be at least one storage device away from the processor 710. The processor 710 may be understood in combination with the terminals described in FIG. 4 to FIG. 6. The memory 720 have stored a group of program codes, and the processor 710 may call the program codes stored in the memory 720 to execute the following operations.

Responsive to detecting that a fingerprint of a user is in contact with a preset fingerprint identification region, a surface humidity of the preset fingerprint identification region is determined.

When the surface humidity is greater than a preset humidity, the fingerprint of the user is acquired through an optical fingerprint sensor.

The fingerprint acquired through the optical fingerprint sensor is matched with pre-stored fingerprint information.

A screen is unlocked in case of successful matching.

Optionally, the operations may further include that:

in case of failed matching, an icon of a semiconductor fingerprint sensor and an icon of the optical fingerprint sensor are displayed on the screen, and the user is prompted whether to switch to the semiconductor fingerprint sensor for fingerprint identification or not;

responsive to determining that the icon of the semiconductor fingerprint sensor is selected, the user is prompted to input the fingerprint again;

the fingerprint input by the user is acquired through the semiconductor fingerprint sensor;

the fingerprint acquired through the semiconductor fingerprint sensor is matched with the pre-stored fingerprint information; and the screen is unlocked in case of successful matching.

Optionally, the operations may further include that:

when the surface humidity is less than or equal to the preset humidity, the fingerprint of the user is acquired through the semiconductor fingerprint sensor;

the fingerprint acquired through the semiconductor fingerprint sensor is matched with the pre-stored fingerprint information; and the screen is unlocked in case of successful matching.

Optionally, the operations may further include that:

an air humidity in an ambient environment is detected to determine the air humidity in the environment; and when the air humidity is greater than an air humidity threshold, the optical fingerprint sensor is determined as a default fingerprint identification sensor.

Optionally, the operations may further include that:

responsive to detecting that the air humidity is less than or equal to the air humidity threshold, the semiconductor fingerprint sensor is determined as the default fingerprint identification sensor.

When the technical solution provided in the disclosure is implemented, responsive to detecting that a fingerprint of a user is in contact with a preset fingerprint identification region, a surface humidity of the preset fingerprint identification region is determined; when the surface humidity is greater than the preset humidity, the fingerprint of the user is acquired through an optical fingerprint sensor; the fingerprint acquired through the optical fingerprint sensor is taken to match with the pre-stored fingerprint information; and a screen is unlocked in case of successful matching. Through the technical solution, a sensor for fingerprint unlocking may be determined according to a humidity of a screen, thereby ensuring stability of fingerprint unlocking and further improving a user experience.

Figure 8:
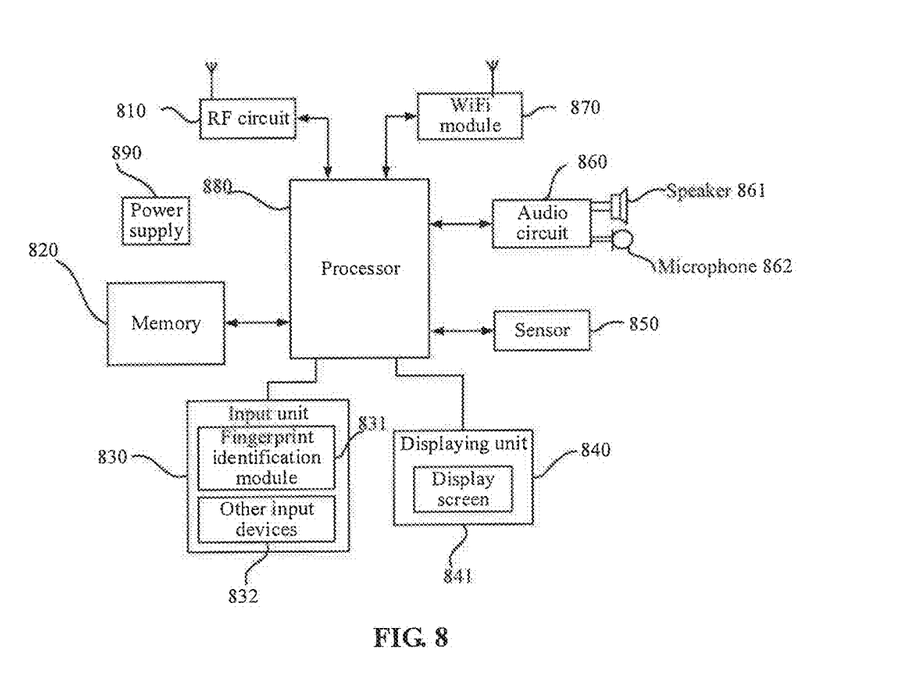
FIG. 8 is a physical structure diagram of a mobile phone according to an embodiment of the disclosure.

Referring to FIG. 8, FIG. 8 is a block diagram of part of a structure of a mobile phone related to a terminal according to an embodiment of the disclosure. Referring to FIG. 8, the mobile phone includes components such as a Radio Frequency (RF) circuit 810, a memory 820, an input unit 830, a displaying unit 840, a sensor 850, an audio circuit 860, a Wireless Fidelity (WiFi) module 870, a processor 880 and a power supply 890. Those skilled in the art should know that the structure of the mobile phone shown in FIG. 8 is not intended to limit the mobile phone and may include components more or fewer than those shown in the figure or some components are combined or different component arrangements are adopted.

Each component of the mobile phone will be introduced below in combination with FIG. 8.

The RF circuit 810 may be configured to receive and send information. The RF circuit 810 usually includes, but not limited to, an antenna, at least one amplifier, a transceiver, a coupler, a Low Noise Amplifier (LNA), a duplexer and the like. In addition, the RF circuit 810 may also communicate with a network and another device through wireless communication. Any communication standard or protocol may be adopted for wireless communication, including, but not limited to, a Global System of Mobile communication (GSM), General Packet Radio Service (CPRS), Code Division Multiple Access (CDMA), Wideband Code Division Multiple Access (WCDMA), Long Term Evolution (LTE), an electronic mail, Short Messaging Service (SMS) and the like.

The memory 820 may be configured to store a software program and a module.

The processor 880 may operate the software program and module stored in the memory 820, thereby executing various functional applications and data processing of the mobile phone. The memory 820 may mainly include a program storage region and a data storage region. The program storage region may have stored an operating system, an application required by at least one function (for example, a screen unlocking function, a biological authentication function and a photographing function) and the like. The data storage region may have stored data (for example, a pre-stored corresponding relationship among a biological characteristic, a user type and a biological characteristic authentication manner) created according to use of the mobile phone and the like. In addition, the memory 820 may include a high-speed RAM and may also include a nonvolatile memory, for example, at least one disk storage device, flash memory device or other volatile solid-state storage device.

The input unit 830 may be configured to receive input digital or character information and generate a key signal input related to user setting and function control of the mobile phone. Specifically, the input unit 830 may include a fingerprint identification module 831 and other input devices 832, The fingerprint identification module 831 may acquire fingerprint data of a user thereon. Optionally, the fingerprint identification module 831 may include an optical fingerprint module, a capacitive fingerprint module and an RE fingerprint module. For example, when the fingerprint identification module 831 is the capacitive fingerprint identification module, the fingerprint identification module 831 may include induction electrodes (n1 abnormality induction electrodes and n2 abnormality induction electrodes) and a signal processing circuit connected with the induction electrodes (for example, an amplification circuit, a noise suppression circuit and an analog-to-digital conversion circuit). Besides the fingerprint identification module 831, the input unit 830 may further include other input devices 832. Specifically, the other input devices 832 may include, but not limited to, one or more of a physical keyboard, a function key (for example, a volume control button and a switch button), a trackball, a mouse, a stick and the like.

The displaying unit 840 may be configured to display information input by the user or information provided for the user and display various menus of the mobile phone. The displaying unit 840 may include a display screen 841, Optionally, the display screen 841 may be configured in form of a Liquid Crystal Display (LCD) and a Organic Light-Emitting Diode (OLED). In FIG. 8, the fingerprint identification module 831 and the display screen 841 may realize input and output functions of the mobile phone as two independent components. However, in some embodiments, the fingerprint identification module 831 and the display screen 841 may be integrated to realize the input and output functions of the mobile phone.

The mobile phone may further include at least one sensor 850, for example, a light sensor, a motion sensor and other sensors. Specifically, the light sensor may include an environmental light sensor and a proximity sensor. The environmental light sensor may regulate brightness of the display screen 841 according to brightness of environmental light, and the proximity sensor may turn off the display screen 841 and/or backlight when the mobile phone is moved to an ear. As a motion sensor, an accelerometer sensor may detect a magnitude of an acceleration in each direction (usually three axes), may detect a magnitude and direction of the gravity under a motionless condition, and may be configured for an application for recognizing a posture of the mobile phone (for example, landscape and portrait switching, a related game and magnetometer posture calibration), and for a function related to vibration identification and the like (for example, a pedometer and knocking). Other sensors, for example, a gyroscope, a barometer, a hygrometer, a thermometer and an infrared sensor, which may be configured in the mobile phone, will not be elaborated herein.

The audio circuit 860 may include a speaker 861, and a microphone 862 may provide an audio interface between a user and the mobile phone. The audio circuit 860 may transmit an electric signal obtained by converting received audio data to the speaker 861, and the speaker 861 may convert it into a sound signal for output. On the other hand, the microphone 862 may convert a collected sound signal into an electric signal, the audio circuit 860 may receive and convert it into audio data, and the audio data may be processed by the output processor 880 and sent to, for example, other mobile phones through the RF circuit 810, or the audio data may be output to the memory 820 for further processing.

WiFi is a short-distance wireless transmission technology. The mobile phone may help a user through the WiFi module 870 to receive and send an electronic mail, browse a webpage, access streaming media and the like. A wireless wideband Internet access may be provided for the user. Although the WiFi module 870 is shown in FIG. 8, it can be understood that it is not a necessary composition of the mobile phone and may completely be omitted according to a requirement without changing the scope of the essence of the disclosure.

The processor 880, which is a control center of the mobile phone, may connect each part of the whole mobile phone via various interfaces and lines and execute various functions and data processing of the mobile phone by running or executing a software program and/or module stored in the memory 820 and by calling data stored in the memory 820, thereby monitoring the whole mobile phone. Optionally, the processor 880 may include one or more processing units. Preferably, the processor 880 may integrate an application processor and a modulation and demodulation processor. The application processor may mainly process an operating system, a user interface, an application program and the like. The modulation and demodulation processor mainly may process wireless communications. It may be understood that the modulation and demodulation processor may also not be integrated into the processor 880.

The mobile phone may further include the power supply 890 for supplying power to each part. Preferably, the power supply may be logically connected with the processor 880 through a power management system, thereby realizing functions of charging and discharging management, power consumption management and the like through the power management system.

Although not shown in the figure, the mobile phone may further include a camera, a Bluetooth module and the like, which will not be elaborated herein.

In the embodiments shown in FIG. 1, FIG. 2 and FIG. 3, each operation of the method may be implemented based on the structure of the mobile phone.

In the embodiments shown in FIG. 4, FIG. 5 and FIG. 6, each functional unit may be implemented based on the structure of the mobile phone.

Figure 9:
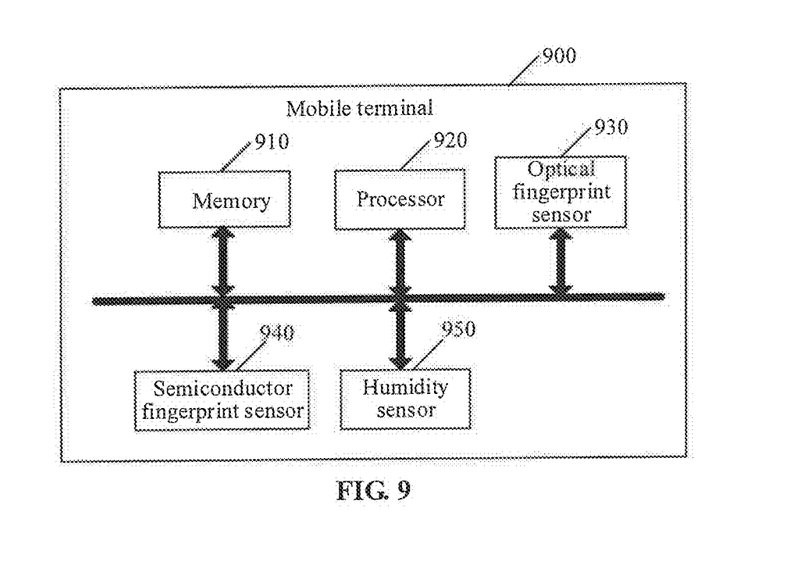
FIG. 9 is a physical structure diagram of another user terminal according to an embodiment of the disclosure.

Referring to FIG. 9, FIG. 9 is a structure diagram of another terminal according to an embodiment of the disclosure. The terminal includes a memory 910, a processor 920, an optical fingerprint sensor 930 and a semiconductor fingerprint sensor 940.

The memory 910 may have stored a program code. When the program code is executed by the processor 920, the processor 920 may execute following operations.

Responsive to detecting that a fingerprint of a user is in contact with a preset fingerprint identification region, a surface humidity of the preset fingerprint identification region may be determined; when the surface humidity is greater than a preset humidity, the fingerprint of the user may be acquired through the optical fingerprint sensor 930; the fingerprint acquired through the optical fingerprint sensor 930 may be taken to match with pre-stored fingerprint information; and a screen may be unlocked in case of successful matching.

Optionally, when the surface humidity is less than or equal to the preset humidity, the fingerprint of the user may be acquired through the semiconductor fingerprint sensor 940; the fingerprint acquired through the semiconductor fingerprint sensor may be taken to match with the pre-stored fingerprint information; and the screen may be unlocked in case of successful matching.

Optionally, the terminal may further include a humidity sensor 950.

The humidity sensor 950 may be configured to detect an air humidity in an ambient environment to determine the air humidity in the environment.

The processor 920 may be further configured to, when the air humidity is greater than an air humidity threshold, determine the optical fingerprint sensor 930 as a default fingerprint identification sensor.

Optionally, the processor 9:20 may be further configured to, responsive to detecting that the air humidity is less than or equal to the air humidity threshold, determine the semiconductor fingerprint sensor 940 as the default fingerprint identification sensor.

Another embodiment of the disclosure discloses a terminal, which includes a memory, a processor, a humidity sensor and an optical fingerprint sensor. There may be pre-stored fingerprint information in the memory.

The humidity sensor may be configured to, responsive to detecting that a fingerprint of a user is in contact with a preset fingerprint identification region, determine a surface humidity of the preset fingerprint identification region.

The processor may be configured to, when the surface humidity is greater than a preset humidity, acquire the fingerprint of the user through the optical fingerprint sensor, match the fingerprint acquired through the optical fingerprint sensor with the pre-stored fingerprint information in the memory and, in case of successful matching, unlock a screen.

Optionally, the terminal may further include a display screen and a semiconductor fingerprint sensor.

The processor may be further configured to, in case of failed matching, send an instruction to the display screen.

The display screen may be configured to, when receiving the instruction sent by the processor, display an icon of the semiconductor fingerprint sensor and an icon of the optical fingerprint sensor and prompt the user whether to switch to the semiconductor fingerprint sensor for fingerprint identification or not.

The processor may be further configured to, responsive to determining that the icon of the semiconductor fingerprint sensor is selected, prompt the user to input the fingerprint again, acquire the fingerprint input by the user through the semiconductor fingerprint sensor, match the fingerprint acquired through the semiconductor fingerprint sensor with the pre-stored fingerprint information and, in case of successful matching, unlock the screen.

Optionally, the processor may be further configured to, when the surface humidity is less than or equal to the preset humidity, acquire the fingerprint of the user through the semiconductor fingerprint sensor, match the fingerprint acquired through the semiconductor fingerprint sensor with the pre-stored fingerprint information and, in case of successful matching, unlock the screen.

Optionally, the humidity sensor may be further configured to detect an air in an ambient environment to determine the air humidity in the environment. The processor is further configured to, when the air humidity is greater than an air humidity threshold, determine the optical fingerprint sensor as a default fingerprint identification sensor.

Optionally, the processor may be further configured to, responsive to detecting that the air humidity is less than or equal to the air humidity threshold, determine the semiconductor fingerprint sensor as the default fingerprint identification sensor.

Another embodiment of the disclosure provides a user identification method, which is applied to a mobile terminal. The mobile terminal includes a processor, and a memory, humidity sensor, optical fingerprint sensor and display which are connected with the processor. There may be pre-stored fingerprint information in the memory. The method may include the following operations.

Responsive to detecting that a fingerprint of a user is in contact with a preset fingerprint identification region, the humidity sensor may determine a surface humidity of the preset fingerprint identification region.

When the surface humidity is greater than a preset humidity, the processor may acquire the fingerprint of the user through the optical fingerprint sensor.

The processor may match the fingerprint acquired through the optical fingerprint sensor with the pre-stored fingerprint information in the memory.

In case of successful matching, the processor may instruct the display to unlock a screen.

Optionally, the terminal may further include a semiconductor fingerprint sensor, and the method may further include the following operations.

In case of failed matching, the processor may send an instruction to the screen of the display.

Upon when receiving the instruction sent by the processor, the display screen may display an icon of the semiconductor fingerprint sensor and an icon of the optical fingerprint sensor and prompt the user whether to switch to the semiconductor fingerprint sensor for fingerprint identification or not.

Responsive to determining that the icon of the semiconductor fingerprint sensor is selected, the processor may prompt the user to input the fingerprint again, the fingerprint input by the user may be acquired through the semiconductor fingerprint sensor, the fingerprint acquired through the semiconductor fingerprint sensor may be taken to match with the pre-stored fingerprint information and, in case of successful matching, the screen is unlocked.

Optionally, the method may further include the following operation.

When the surface humidity is less than or equal to the preset humidity, the processor may acquire the fingerprint of the user through the semiconductor fingerprint sensor, match the fingerprint acquired through the semiconductor fingerprint sensor with the pre-stored fingerprint information in the memory and, in case of successful matching, instruct the display to unlock the screen.

Optionally, the humidity sensor may detect an air in an ambient environment to determine the air humidity in the environment. When the air humidity is greater than an air humidity threshold, the processor may determine the optical fingerprint sensor as a default fingerprint identification sensor.

Optionally, responsive to detecting that the air humidity is less than or equal to the air humidity threshold, the semiconductor fingerprint sensor may be determined as the default fingerprint identification sensor.

An embodiment of the disclosure provides a terminal, which includes a humidity sensor, an optical fingerprint sensor and a semiconductor fingerprint sensor.

The humidity sensor may be configured to, responsive to detecting that a fingerprint of a user is in contact with a preset fingerprint identification region, determine a surface humidity of the preset fingerprint identification region.

The optical fingerprint sensor may be configured to, when the surface humidity of the preset fingerprint identification region is greater than a preset humidity, acquire the fingerprint of the user.

The semiconductor fingerprint sensor may be configured to, when the surface humidity of the preset fingerprint identification region is less than or equal to the preset humidity, acquire the fingerprint of the user.

Optionally, the terminal may include a memory and a processor.

The memory may be configured to store pre-stored fingerprint information.

The processor may be configured to, when the surface humidity is greater than the preset humidity, send a fingerprint acquisition instruction to the optical fingerprint sensor.

The optical fingerprint sensor may be configured to acquire the fingerprint of the user according to the fingerprint acquisition instruction sent by the processor.

The processor may be further configured to receive fingerprint information fed back by the optical fingerprint sensor, match the fingerprint acquired through the optical fingerprint sensor with the pre-stored fingerprint information in the memory and, in case of successful matching, unlock a screen.

Optionally, the processor may be further configured to, in case of failed matching, send an instruction to the display screen. The display screen may be configured to, when receiving the instruction sent by the processor, display an icon of the semiconductor fingerprint sensor and an icon of the optical fingerprint sensor and prompt the user whether to switch to the semiconductor fingerprint sensor for fingerprint identification or not. The processor may be further configured to, responsive to determining that the icon of the semiconductor fingerprint sensor is selected, prompt the user to input the fingerprint again. The semiconductor fingerprint sensor may be configured to acquire the fingerprint input by the user. The processor may be further configured to match the fingerprint acquired through the semiconductor fingerprint sensor with the pre-stored fingerprint information and, in case of successful matching, unlock the screen.

Optionally, the processor may be further configured to, when the surface humidity is less than or equal to the preset humidity, send the fingerprint acquisition instruction to the semiconductor fingerprint sensor. The semiconductor fingerprint sensor may be configured to acquire the fingerprint of the user according to the fingerprint acquisition instruction sent by the processor. The processor may be further configured to receive the fingerprint information fed back by the semiconductor fingerprint sensor, match the fingerprint acquired through the semiconductor fingerprint sensor with the pre-stored fingerprint information and, in case of successful matching, unlock the screen.

Optionally, the humidity sensor may be further configured to detect an air humidity in an ambient environment to determine the air humidity in the environment. The processor may be further configured to, when the air humidity is greater than an air humidity threshold, determine the optical fingerprint sensor as a default fingerprint identification sensor and, responsive to detecting that the air humidity is less than or equal to the air humidity threshold, determine the semiconductor fingerprint sensor as the default fingerprint identification sensor.

Another embodiment of the disclosure provides a fingerprint acquisition method, which is applied to a mobile terminal. The mobile terminal includes a humidity sensor, an optical fingerprint sensor and a semiconductor fingerprint sensor. The method may include that; responsive to detecting that a fingerprint of a user is in contact with a preset fingerprint identification region, the humidity sensor determines a surface humidity of the preset fingerprint identification region; when the surface humidity is greater than a preset humidity, the optical fingerprint sensor acquires the fingerprint of the user; and when the surface humidity is less than or equal to the preset humidity, the semiconductor fingerprint sensor acquires the fingerprint of the user.

Optionally, the terminal may further include a processor and a memory. The memory may have pre-stored fingerprint information.

The processor may receive fingerprint information fed back by the semiconductor fingerprint sensor or the optical fingerprint sensor and match the fed back fingerprint information with the pre-stored fingerprint information in the memory. In case of successful matching, the processor may instruct a display to unlock a screen.

Optionally, the method may further include that; when an air humidity is greater than an air humidity threshold, the processor determines the optical fingerprint sensor as a default fingerprint identification sensor; and responsive to detecting that the air humidity is less than or equal to the air humidity threshold, the semiconductor fingerprint sensor is determined as the default fingerprint identification sensor.

Optionally, the method may further include the following operations.

When the surface humidity is greater than the preset humidity, the processor may send a fingerprint acquisition instruction to the optical fingerprint sensor.

The optical fingerprint sensor may acquire the fingerprint of the user according to the fingerprint acquisition instruction sent by the processor.

The processor may receive the fingerprint information fed back by the optical fingerprint sensor, and match the fingerprint acquired through the optical fingerprint sensor with the pre-stored fingerprint information in the memory. In case of successful matching, a screen may be unlocked. For example, an unlocking instruction may be sent to a display screen, and the display screen, after receiving the unlocking instruction, may perform screen unlocking.

Optionally, in case of failed matching, the processor may send an instruction to the display screen. When receiving the instruction sent by the processor, the display screen may display an icon of the semiconductor fingerprint sensor and an icon of the optical fingerprint sensor and prompts the user whether to switch to the semiconductor fingerprint sensor for fingerprint identification or not. Responsive to determining that the icon of the semiconductor fingerprint sensor is selected, the processor may prompt the user to input the fingerprint again. The semiconductor fingerprint sensor may acquire the fingerprint input by the user. The processor may match the fingerprint acquired through the semiconductor fingerprint sensor with the pre-stored fingerprint information and, in case of successful matching, the screen may be unlocked.

Those of ordinary skill in the art may understand that all or part of operations in each method of the above-mentioned embodiments may be completed by instructing related hardware through a program, the program may be stored in a computer-readable storage medium, and the storage medium includes a Read-Only Memory (ROM), a RAM, a Programmable ROM (PROM), an Erasable PROM (ERPOM), a One-time PROM (OTPROM), an Electrically-Erasable PROM (EEPROM), a Compact Disc Read-Only Memory (CD-ROM) or another optical disc memory, a disk memory, a magnetic tape memory or any other computer-readable medium capable of containing or storing data.

The image-based screen unlocking method and user terminal described in the embodiments of the disclosure are introduced above in detail, the principle and implementations of the disclosure are elaborated with specific examples in the disclosure, and the descriptions made to the embodiments are only adopted to help the method of the disclosure and the core concept thereof to be understood. In addition, those of ordinary skill in the art may make variations to the specific implementations and the application scope according to the concept of the disclosure, From the above, the contents of the specification should not be understood as limits to the disclosure.

The invention claimed is:

1. A method for user identification, comprising:
responsive to detecting that a fingerprint of a user is in contact with a preset fingerprint identification region, determining a surface humidity of the preset fingerprint identification region;
when the surface humidity is greater than a preset humidity, acquiring the fingerprint of the user through an optical fingerprint sensor;
matching the fingerprint acquired through the optical fingerprint sensor with pre-stored fingerprint information; and
unlocking a screen in case of successful matching,
the method further comprising:
detecting an air humidity in an environment to determine the air humidity in the environment; and
when the air humidity is greater than an air humidity threshold, determining the optical fingerprint sensor as a default fingerprint identification sensor.

2. The method of claim 1, further comprising:
in case of failed matching, displaying an icon of a semiconductor fingerprint sensor and an icon of the optical fingerprint sensor on the screen, and prompting the user whether to switch to the semiconductor fingerprint sensor for fingerprint identification or not;
responsive to determining that the icon of the semiconductor fingerprint sensor is selected, prompting the user to input the fingerprint again;
acquiring the fingerprint input by the user through the semiconductor fingerprint sensor;
matching the fingerprint acquired through the semiconductor fingerprint sensor with the pre-stored fingerprint information; and
unlocking the screen in case of successful matching.

3. The method of claim 1, further comprising:
when the surface humidity is less than or equal to the preset humidity, acquiring the fingerprint of the user through the semiconductor fingerprint sensor;
matching the fingerprint acquired through the semiconductor fingerprint sensor with the pre-stored fingerprint information; and
unlocking the screen in case of successful matching.

4. The method of claim 1, further comprising:
responsive to detecting that the air humidity is less than or equal to the air humidity threshold, determining the semiconductor fingerprint sensor as the default fingerprint identification sensor.

5. A terminal, comprising:
a memory have stored an executable program code; and
a processor coupled to the memory, wherein
the processor calls the executable program code stored in the memory to execute the method of claim 1.

6. The terminal of claim 5, wherein the processor further calls the executable program code stored in the memory to further execute steps of:
in case of failed matching, controlling the screen of the terminal to display an icon of a semiconductor fingerprint sensor and an icon of the optical fingerprint sensor on the screen;
prompting the user whether to switch to the semiconductor fingerprint sensor for fingerprint identification or not;
responsive to determining that the icon of the semiconductor fingerprint sensor is selected, prompting the user to input the fingerprint again;
controlling the semiconductor fingerprint sensor to acquire the fingerprint input by the user through;
matching the fingerprint acquired through the semiconductor fingerprint sensor with the pre-stored fingerprint information; and
unlocking the screen in case of successful matching.

7. The terminal of claim 5, wherein the processor further calls the executable program code stored in the memory to further execute steps of:
when the surface humidity is less than or equal to the preset humidity, controlling the semiconductor fingerprint sensor to acquire the fingerprint of the user;
matching the fingerprint acquired through the semiconductor fingerprint sensor with the pre-stored fingerprint information; and
unlocking the screen in case of successful matching.

8. The terminal of claim 7, wherein the processor further calls the executable program code stored in the memory to further execute steps of:
detecting an air humidity in an environment to determine the air humidity in the environment; and
when the air humidity is greater than an air humidity threshold, determining the optical fingerprint sensor as a default fingerprint identification sensor.

9. The terminal of claim 8, wherein the processor further calls the executable program code stored in the memory to further execute steps of:
responsive to detecting that the air humidity is less than or equal to the air humidity threshold, determining the semiconductor fingerprint sensor as the default fingerprint identification sensor.

10. A computer-readable storage medium, have stored a computer program for electronic data exchange, wherein the computer program enables a terminal to execute the method of claim 1.

11. A terminal, comprising a humidity sensor, an optical fingerprint sensor and a semiconductor fingerprint sensor, wherein
the humidity sensor is configured to, responsive to detecting that a fingerprint of a user is in contact with a preset fingerprint identification region, determine a surface humidity of the preset fingerprint identification region;
the optical fingerprint sensor is configured to, when the surface humidity of the preset fingerprint identification region is greater than a preset humidity, acquire the fingerprint of the user; and the semiconductor fingerprint sensor is configured to, when the surface humidity of the preset fingerprint identification region is less than or equal to the preset humidity, acquire the fingerprint of the user.

12. The terminal of claim 11, further comprising a memory and a processor, wherein the memory is configured to store pre-stored fingerprint information;

the processor is configured to, when the surface humidity is greater than the preset humidity, send a fingerprint acquisition instruction to the optical fingerprint sensor;

the optical fingerprint sensor is configured to acquire the fingerprint of the user according to the fingerprint acquisition instruction sent by the processor; and the processor is further configured to receive fingerprint information fed back by the optical fingerprint sensor, match the fingerprint acquired through the optical fingerprint sensor with the pre-stored fingerprint information in the memory and, in case of successful matching, perform screen unlocking.

13. The terminal of claim 12, wherein the processor is further configured to, in case of failed matching, send an instruction to a display screen;

the display screen is configured to, when receiving the instruction from the processor, display an icon of the semiconductor fingerprint sensor and an icon of the optical fingerprint sensor and prompt the user whether to switch to the semiconductor fingerprint sensor for fingerprint identification or not;

the processor is further configured to, responsive to determining that the icon of the semiconductor fingerprint sensor is selected, prompt the user to input the fingerprint again;

the semiconductor fingerprint sensor is configured to acquire the fingerprint input by the user; and the processor is further configured to match the fingerprint acquired through the semiconductor fingerprint sensor with the pre-stored fingerprint information and, in case of successful matching, perform screen unlocking.

14. The terminal of claim 13, wherein the processor is further configured to, when the surface humidity is less than or equal to the preset humidity, send the fingerprint acquisition instruction to the semiconductor fingerprint sensor;

the semiconductor fingerprint sensor is configured to acquire the fingerprint of the user according to the fingerprint acquisition instruction sent by the processor; and the processor is further configured to receive the fingerprint information fed back by the semiconductor fingerprint sensor, match the fingerprint acquired through the semiconductor fingerprint sensor with the pre-stored fingerprint information and, in case of successful matching, perform screen unlocking.

15. The terminal of claim 14, wherein the humidity sensor is further configured to detect an air humidity in an environment to determine the air humidity in the environment; and the processor is further configured to, when the air humidity is greater than an air humidity threshold, determine the optical fingerprint sensor as a default fingerprint identification sensor and, responsive to detecting that the air humidity is less than or equal to the air humidity threshold, determine the semiconductor fingerprint sensor as the default fingerprint identification sensor.

16. A method for fingerprint acquisition, applied to a mobile terminal, the mobile terminal comprising a humidity sensor, an optical fingerprint sensor and a semiconductor fingerprint sensor and the method comprising:

responsive to detecting that a fingerprint of a user is in contact with a preset fingerprint identification region, determining, by the humidity sensor, a surface humidity of the preset fingerprint identification region;

when the surface humidity is greater than a preset humidity, acquiring, by the optical fingerprint sensor, the fingerprint of the user; and when the surface humidity is less than or equal to the preset humidity, acquiring, by the semiconductor fingerprint sensor, the fingerprint of the user.

17. The method of claim 16, wherein the terminal further comprises a processor and a memory; the memory has pre-stored fingerprint information;

receiving, by the processor, fingerprint information fed back by the semiconductor fingerprint sensor or the optical fingerprint sensor, matching, by the processor, the fed back fingerprint information with the pre-stored fingerprint information in the memory; and in case of successful matching, instructing, by the processor, a display to perform screen unlocking.

18. The method of claim 17, further comprising:

when an air humidity is greater than an air humidity threshold, determining, by the processor, the optical fingerprint sensor as a default fingerprint identification sensor; and responsive to detecting that the air humidity is less than or equal to the air humidity threshold, determining the semiconductor fingerprint sensor as the default fingerprint identification sensor.

* * * * *